United States Patent
Sultan et al.

[19]

[11] Patent Number: 6,131,453

[45] Date of Patent: Oct. 17, 2000

[54] BI-DIRECTIONAL MASS AIRFLOW SENSOR HAVING INTEGRAL WHEATSTONE BRIDGE

[75] Inventors: Michel Farid Sultan; Charles Robert Harrington, both of Troy, Mich.

[73] Assignee: General Motors Corporation, Detroit, Mich.

[21] Appl. No.: 09/106,542

[22] Filed: Jun. 29, 1998

Related U.S. Application Data

[63] Continuation-in-part of application No. 08/919,644, Aug. 28, 1997, Pat. No. 5,827,960.

[51] Int. Cl.$^7$ .......................................................... G01F 1/68
[52] U.S. Cl. ............................................................ 73/204.26
[58] Field of Search ............................. 73/204.26, 204.25, 73/204.17

[56] References Cited

U.S. PATENT DOCUMENTS

| | | | |
|---|---|---|---|
| 4,279,147 | 7/1981 | Djorup | 73/189 |
| 4,576,050 | 3/1986 | Lambert | 73/861.05 |
| 4,677,850 | 7/1987 | Miura et al. | 73/204.23 |
| 4,782,708 | 11/1988 | Harrington et al. | 73/861.05 |
| 4,966,037 | 10/1990 | Sumner et al. | 73/204.26 |
| 5,086,950 | 2/1992 | Harrington et al. | 73/204.26 |
| 5,243,858 | 9/1993 | Erskine et al. | 73/204.26 |
| 5,263,380 | 11/1993 | Sultan | 73/204.26 |
| 5,515,714 | 5/1996 | Sultan et al. | 73/25.01 |
| 5,520,047 | 5/1996 | Takahashi et al. | 73/204.26 |
| 5,569,851 | 10/1996 | Ichimaru et al. | 73/204.26 |
| 5,629,481 | 5/1997 | Sultan | 73/204.18 |

*Primary Examiner*—Harshad Patel
*Attorney, Agent, or Firm*—Vincent A. Cichosz

[57] ABSTRACT

A low cost, bi-directional airflow sensing device based on sensed temperature differential due to airflow achieves improved sensitivity and accuracy, and reduced manufacturing cost, by providing two separate pairs of upstream and downstream sensing elements on the same substrate, and connecting the sensing elements as the four legs of an on-chip Wheatstone bridge. The sensitivity is at least doubled since sensor elements are connected in each of the bridge legs, and accuracy and cost are improved through the elimination of off-chip bridge resistors. Additional improvements in the susceptibility to electromagnetic interference (EMI) are realized since the bridge is fully closed on the sensor substrate, and the bridge resistors are located in close proximity.

11 Claims, 6 Drawing Sheets

BI-DIRECTIONAL MASS AIRFLOW SENSOR HAVING INTEGRAL WHEATSTONE BRIDGE

This application is a continuation-in-part of the assigned U.S. patent application Ser. No. 08/919,644 filed Aug. 28, 1997 now U.S. Pat. No. 5,827,960.

This invention relates to a bi-directional airflow sensing device having upstream and downstream temperature sensor elements, and more particularly to a sensor configuration in which two pairs of sensor elements are connected to form an integral Wheatstone bridge for measuring mass airflow.

BACKGROUND OF THE INVENTION

Mass airflow information required for precise fueling of an automotive internal combustion engine is commonly obtained with a mass airflow sensor installed upstream from the intake manifold of the engine. In order to avoid error due to momentary flow reversals in the manifold, the sensor preferably measures both in-flow and out-flow; that is, the sensor must be bi-directional.

A well known bidirectional sensor topology comprises two temperature sensor elements disposed in-line along the intake air stream, and a heater element disposed between the two sensor elements. Airflow in the manifold is detected as a function of the difference between the temperatures at the two sensor locations. When there is no flow, equal amounts of heat from the heater element reach both sensor elements, and no temperature difference is detected. With an air in-flow or out-flow, one of the sensors (the downstream sensor) is heated more than the other sensor (the upstream sensor), resulting in a sensed temperature difference that varies monotonically with airflow. The temperature sensors are typically connected with a pair of external precision resistors to form a Wheatstone bridge circuit to convert the sensed temperature difference into a corresponding voltage. Representative sensor configurations of this type are shown and described in the U.S. Pat. Nos. 4,576,050, 5,243,858, 5,263,380, 5,629,481 and 5,631,417, all of which are assigned to the assignee of the present invention.

While the above-described sensor topology is advantageous in many respects including low cost of manufacture and small package size, it tends to exhibit inherent limitations in sensitivity and accuracy due to the bridge characteristics, parasitic resistance and mismatches in the temperature coefficient of resistance (TCR) of the on-chip and external resistances. While these limitations can be compensated to a certain extent through the use of high gain amplification and exotic materials, these techniques add significantly to the cost of the sensor. What is desired is a new sensing device that retains the packaging and low cost advantages and the fast r esponse time and wide bandwidth of the above-described sensor topology while overcoming these performance limitations.

SUMMARY OF THE PRESENT INVENTION

The present invention is directed to an improved, low cost, bidirectional airflow sensing device based on sensed temperature differential in airflow, and having improved sensitivity and accuracy, and reduced manufacturing cost, compared to previously known sensing devices.

According to the invention, the performance and cost improvements are achieved by providing two separate pairs of upstream and downstream sensing elements on the same substrate, and connecting the sensing elements as the four legs of an on-chip Wheatstone bridge. The sensitivity is at least doubled since sensor elements are connected in each of the bridge legs, and accuracy and cost are improved through the elimination of off-chip bridge resistors. In addition, the fast response time and wide bandwidth of the earlier designs have been retained. Additional improvements in susceptibility to electromagnetic interference (EMI) are realized since the bridge is fully closed on the sensor substrate, and the bridge resistors are located in close proximity.

DETAILED DESCRIPTION OF THE DRAWINGS

Figure 1A:
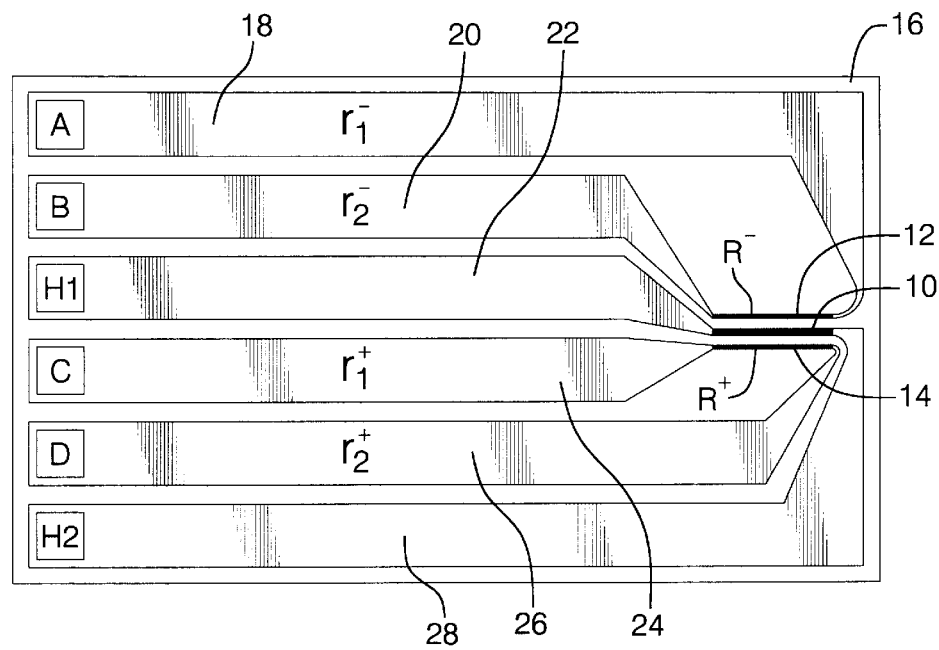
FIGS. 1A–1C depict a prior art mass airflow sensing device.
Figure 1B:
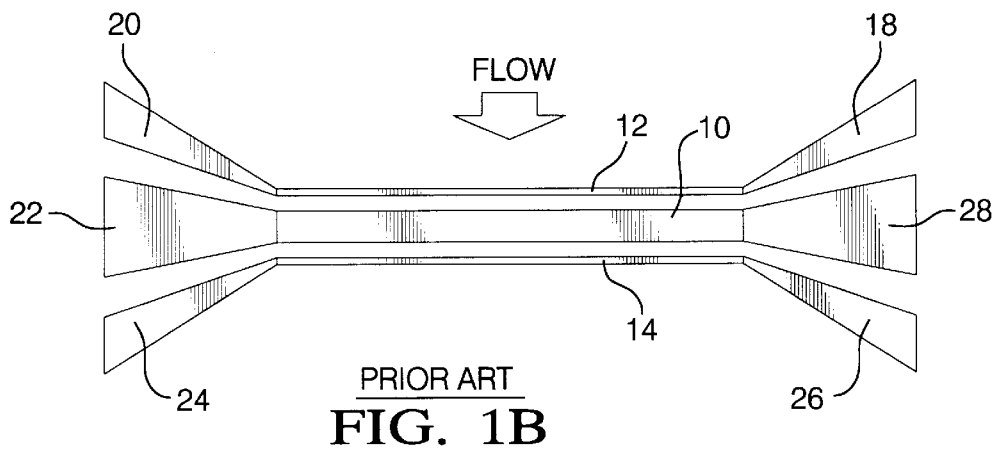
Figure 1C:
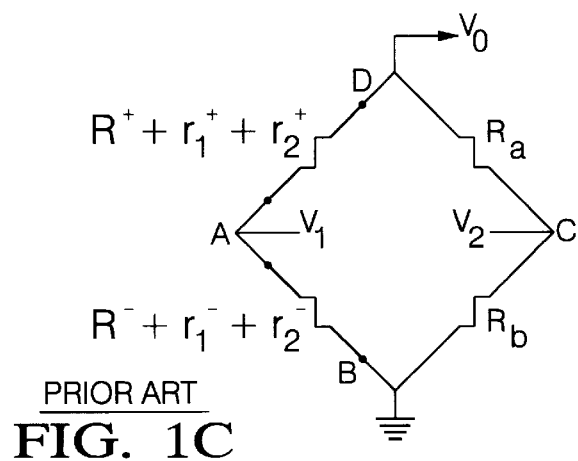

A prior art sensor topology of the type referred to above is illustrated in FIGS. 1A–1C. The sensor, depicted in FIG. 1A, comprises a heating element 10 and two temperature sensor elements 12 and 14 formed on a substrate 16. The substrate 16 may be a silicon wafer, coated with a thermal insulating material such as polyimide, silicon dioxide, silicon nitride or oxynitride to limit heat conduction through the substrate. The heating and sensor elements 10–14 are typically formed of platinum, and an array of generally parallel conductive traces 18–28 couple the elements 10–14 to a series of bond pads designated by the letters A, B C, D, H1 and H2. As seen in FIG. 1A, the heating element 10 is accessed by the bond pads H1–H2, the sensor element 12 by the bond pads A–B, and the sensor element 14 by the bond pads C–D.

The sensor elements 12 and 14 are essentially temperature sensitive resistors, and are additionally designated in FIGS. 1A–1C as having nominal resistances $R^-$ and $R^+$, respectively. To minimize parasitic resistance, the conductive traces 18–28 sometimes incorporate a gold metallization layer. Residual parasitic resistance in the sensor element traces 18, 20, 24 and 26 are designated as $r_1^-$, $r_2^-$, $r_1^+$ and $r_2^+$ respectively.

As specifically shown in FIG. 1B, the airflow is assumed to be in the downward direction as viewed in the figures. According to this convention, sensor element 12 is considered as the upstream sensor, while sensor element 14 is considered as the downstream sensor, with the understanding that such designations reverse when the direction of airflow reverses.

The sensor is designed so that, as much as possible, heating of the sensor elements 12 and 14 is attributable solely to the heater element 10. Thus, the sensor elements 12 and 14 are designed to operate at low current levels to minimize self heating. With no airflow across the sensor, equal amounts of heat from the heater element 10 reach both sensors, resulting in no detectable temperature difference at the two elements. With airflow across the sensor, more heat is carried to the downstream sensor than to the upstream sensor, increasing the downstream resistance $R^+$ with respect to the upstream resistance $R^-$. This results in a sensed temperature difference, the sign of which indicates the direction of airflow, and the magnitude of which indicates the airflow magnitude.

The temperature difference is converted to a voltage difference by configuring the sensors 12 and 14 as two legs of a Wheatstone bridge, as shown in FIG. 1C. The other branch of the bridge comprises a pair of precision resistors designated as $R_a$ and $R_b$, one of which is laser trimmable for the purpose of balancing the bridge. Including parasitic resistance, the upstream sensor leg of the bridge is the sum of $R^+$, $r_1^-$ and $r_2^+$, and the downstream sensor leg of the bridge is the sum of $R^-$, $r_1^-$ and $r_2^-$. A known voltage $V_0$ is applied to terminals D and B of the bridge, and the bridge resistors $R_a$ and $R_b$ are trimmed so that the output voltages $V_1$ and $V_2$ are equal when there is no airflow. With airflow, assuming that the parasitic resistances are all equal to r, the voltage difference $V_2-V_1$ may be given by the expression:

$$V_2-V_1=V_0[\Delta R/(2R_0+4r)] \quad (1)$$

where $\Delta R$ is the incremental or decremental change in resistance (assumed equal) of the downstream and upstream sensors, and $R_0$ is upstream or downstream resistance (assumed equal) with no airflow. The incremental resistance $\Delta R$ increases as the airflow increases, typically with a logarithmic type of dependence, producing a proportionately increasing voltage difference. The voltage difference $V_2-V_1$ is typically sensed with a differential amplifier, and significant amplification is required due to the low signal voltages.

In addition to the low signal levels, the utility of the above-described sensor topology is also adversely affected by the TCR characteristics of the different sensing and balancing resistors in the bridge. With different TCR characteristics, the various resistors exhibit different changes in resistance as the ambient temperature in the manifold changes, possibly unbalancing the bridge and generating an erroneous signal at the output of the sensor. While these errors can be avoided by selecting resistors with matched TCR characteristics, the degree of matching required to maintain high accuracy would require expensive, high performance resistors.

The sensing device of the present invention minimizes the inherent limitations of the above-described sensing device by providing two separate pairs of upstream and downstream sensing elements on the same substrate, and connecting the sensing elements as the four legs of an on-chip Wheatstone bridge. Accordingly, both branches of the Wheatstone bridge are active sensing branches, with all four resistors changing value when subjected to flow.

The separation distance between the two sets of heater/detectors must be larger than a minimum value to avoid thermal coupling between the two branches. The minimum distance depends on the choice of substrate material and its geometry. For example, in a sensor formed on a silicon substrate having a thin coating of thermally insulative material such as polyimide, silicon dioxide, silicon nitride or oxy-nitride, the surface temperature drops off very quickly on each side of the heater elements. This also means that the temperature sensor elements for each heater/detector set should be very close to the respective heater element; in practice, it has been found that the gap between the sensor element and its associated heater element should be less than 75 microns. On the other hand, a displacement of 500 microns or more between heater/detector sets is desirable to minimize set-to-set thermal coupling, although smaller displacements are possible.

Figure 2A:
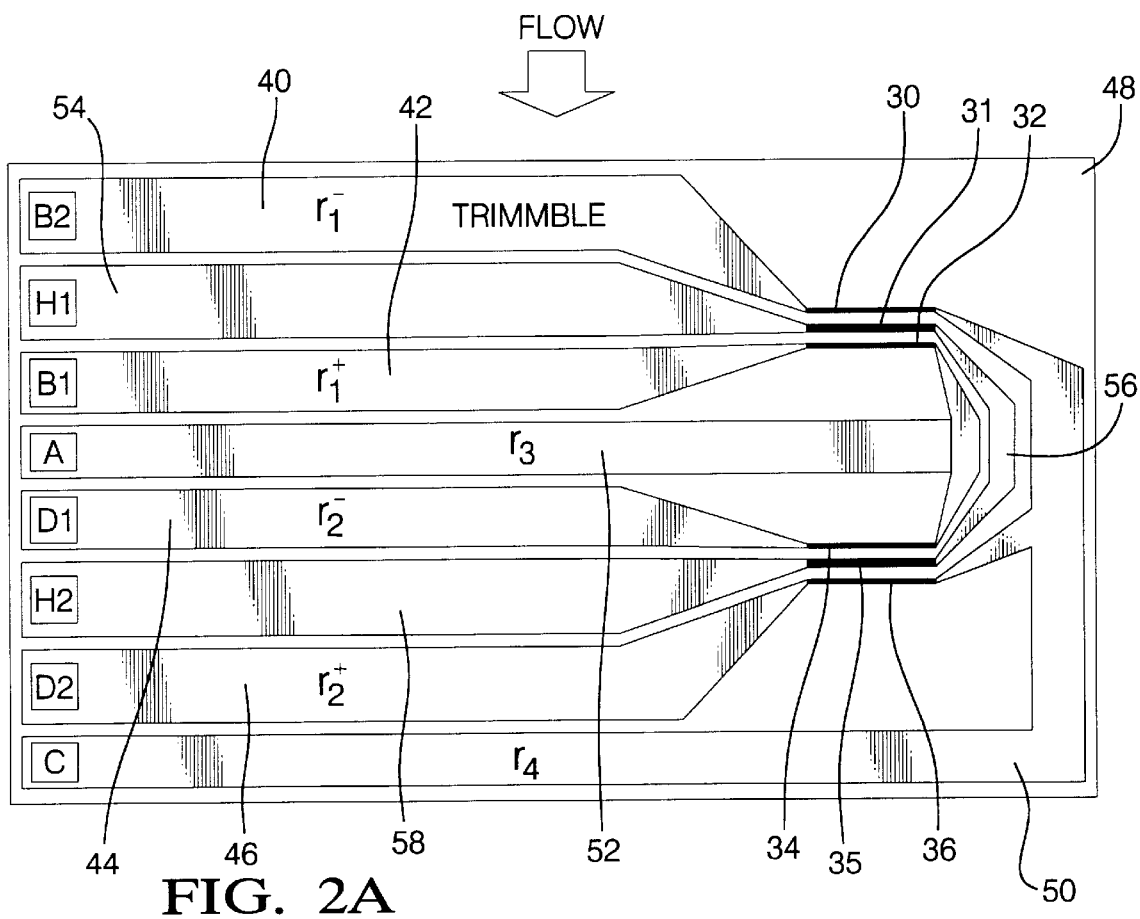
FIGS. 2A–2B depict a mass airflow sensing device according to a first embodiment of this invention.
Figure 2B:
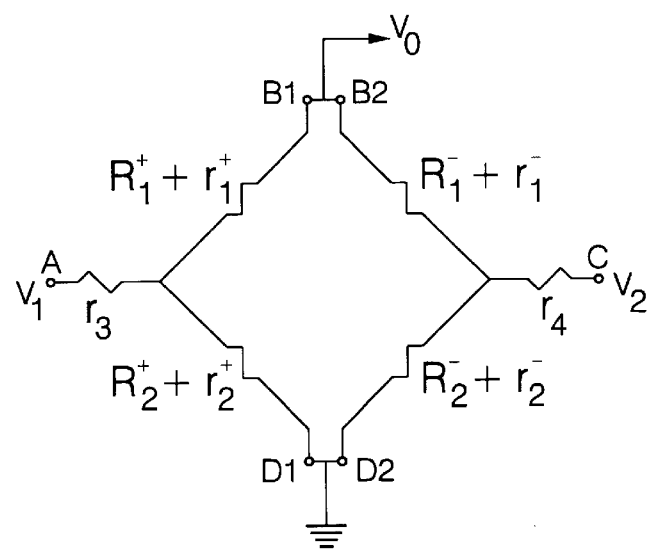

A first mechanization, depicted in FIGS. 2A–2C, includes a first heater/detector set comprising the heater element 31, upstream sensor element 30, and downstream sensor element 32, and a second heater/detector set comprising the heater element 35, upstream sensor element 34, and downstream sensor element 36, all mounted on the substrate 48. The resistances of the upstream and downstream sensor elements 30 and 32 in the first pair are designated as $R_1^-$ and $R_2^+$, while the resistances of the upstream and downstream sensor elements 34 and 36 in the second pair are designated as $R_2^-$ and $R_2^+$. Conductive traces 40, 42, 44 and 46 couple one end of the sensor elements 30, 32, 34 and 36 to bond pads designated as B2, B1, D1 and D2, respectively. The opposite ends of sensor elements 30 and 36 are mutually coupled to bond pad C by the conductive trace 50, and the opposite ends of sensor elements 32 and 34 are mutually coupled to bond pad A by the conductive trace 52. The parasitic resistances of the conductive traces 50 and 52 are designated as $r_4$ and $r_3$, respectively. The heater elements 31 and 35 are connected in series between the bond pads H1 and H2 by the conductive traces 54, 56 and 58. As with the sensing device of FIGS. 1A–1C, the sensor and heater elements 30–36 may be formed of platinum, and the substrate 48 may be a wafer of silicon coated with polyimide, silicon dioxide, silicon nitride or oxy-nitride, or any combination of such materials.

FIG. 2B is an electrical schematic of the above-described sensor topology, illustrating that the sensor elements are connected in the form of a Wheatstone bridge, with sensor elements in each of the four legs of the bridge. The bond pads B1 and B2 are joined, as are the bond page D1 and D2, and a known voltage $V_0$ is applied across the pads B1/B2 and D1/D2. The bond pads B1/B2 and D1/D2 may be joined on-chip as shown, for example, in the embodiment of FIG. 3, or by wire-bonding to a common point on an underlying circuit. One or more of the conductive traces 40–46 are trimmable (with a laser, for example) as indicated in FIG. 2A so that the output voltages $V_1$ and $V_2$ at bond pads A and C are equal when there is no airflow.

With airflow, assuming that the parasitic resistances are all equal to r, the voltage difference $V_2-V_1$ of the bridge shown in FIG. 2B may be given by the expression:

$$V_2-V_1=V_0[\Delta R/(R_0+r)] \quad (2)$$

where $\Delta R$ is the incremental or decremental change in resistance (assumed equal) of the downstream and upstream sensors, and $R_0$ is upstream or downstream resistance (assumed equal) with no airflow. As compared to expression (1), it will be seen that the two pair configuration more than doubles the sensitivity of the sensing device. In other words, a given incremental resistance change $\Delta R$ will produce a voltage difference $V_2-V_1$ more than twice as large as the prior art sensor topology. If the parasitic resistances r are very small, the sensitivity is approximately doubled; if the parasitic resistances are comparable to the sensor element resistances, the sensitivity is approximately tripled.

With the above-described configuration, it will be seen that no balancing resistors are required, and that the four legs of the bridge have nearly identical temperature coefficient of resistance (TCR) characteristics, since they are fabricated simultaneously on the same substrate, using the same fabrication process. As a result, the bridge is closer to a balanced state and is much easier and quicker to balance. Any trimming for balancing can be done on-chip, and at the wafer level, by designing the topology such that one of the parasitic resistances, together with its respective sensor element, has a smaller total resistance compared to the other bridge resistances. This may be accomplished, as seen in FIG. 2A, by increasing the width of conductive trace 40, as compared with the widths of conductive traces 42, 44 and 46. Then during balancing, the wider conductive trace 40 can be trimmed on-chip to a higher value, eliminating a costly calibration step during air meter assembly. Further, immunity to electromagnetic interference (EMI) is increased since all of the bridge resistances are in close proximity, on the same substrate.

Figure 3:
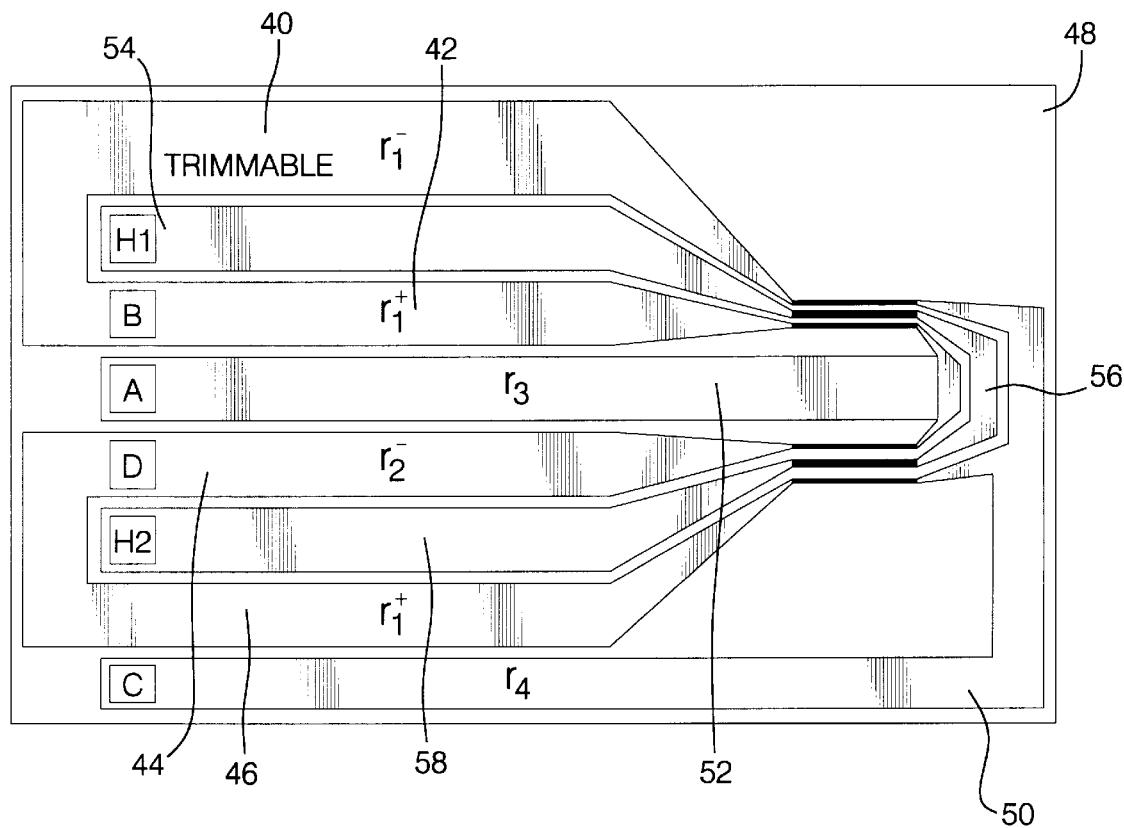
FIG. 3 depicts a mass airflow sensing device according to a second embodiment of this invention.

FIG. 3 illustrates a second embodiment of the sensor in which the bond pads B1/B2 and D1/D2 may be joined on-chip to provide a bridge that is fully closed on-chip. This is advantageous because it improves the stability of the sensor and its immunity to EMI. In other respects, the embodiment of FIG. 3 is like the embodiment described above in reference to FIGS. 2A–2B.

Figure 4A:
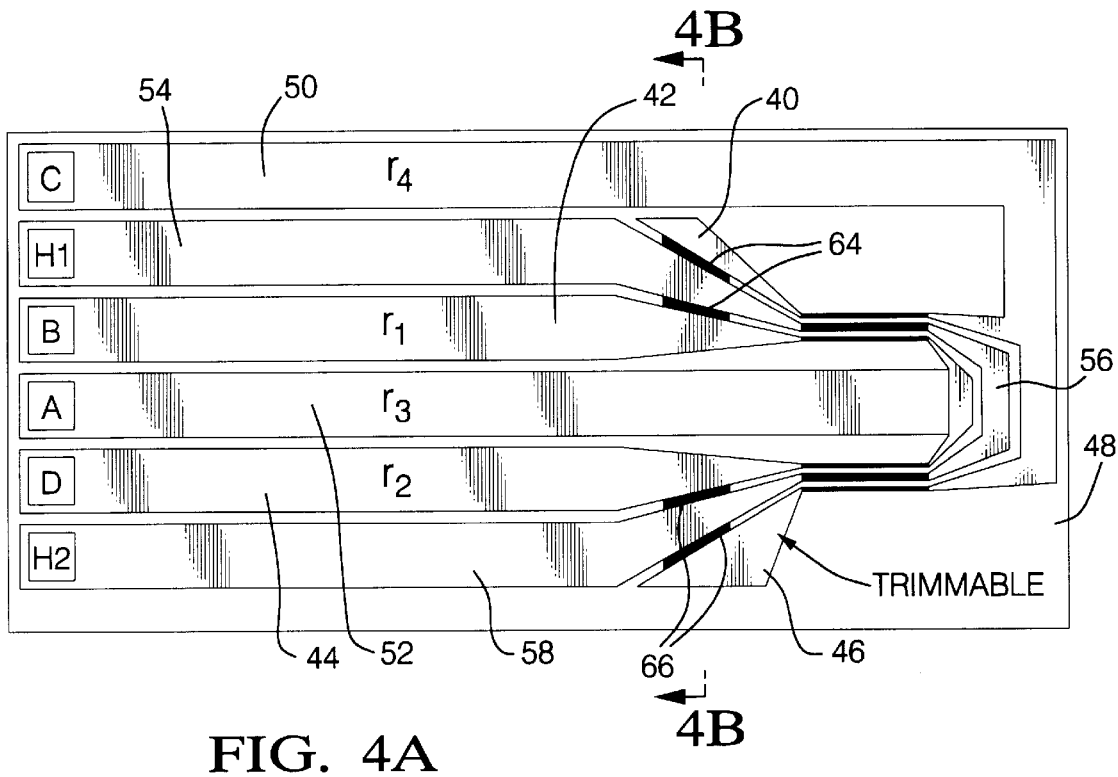
FIGS. 4A–4C depict a mass airflow sensing device according to a third embodiment of this invention.
Figure 4B:
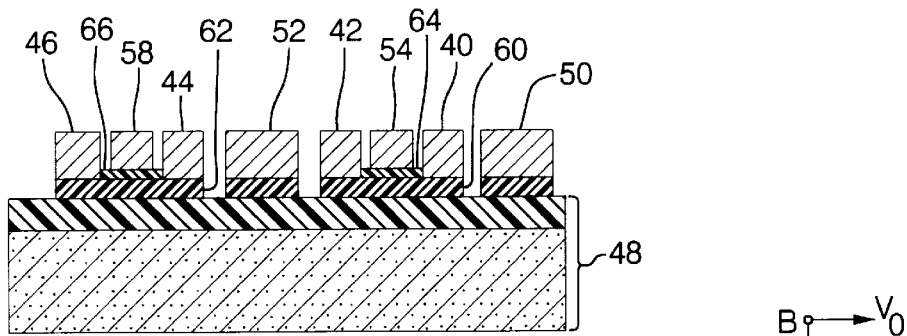
Figure 4C:
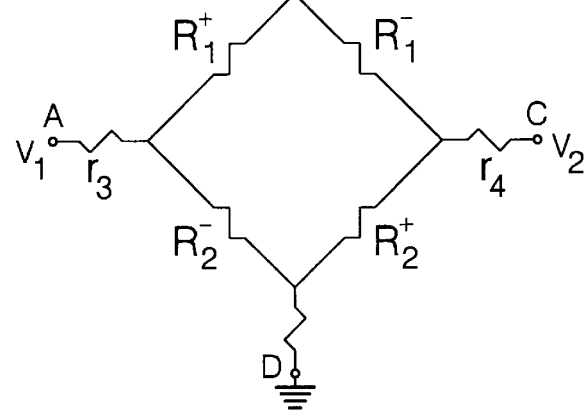

FIGS. 4A–4C depict a third embodiment of the sensor in which lateral conductive shunting is used to join sensor elements to form the bridge topology, thereby reducing width of the sensor. As best seen in the crosssection of FIG. 4B, the conductive traces 40 and 42 are joined by the lateral conductive shunt 60, and the conductive traces 44 and 46 are joined by the lateral conductive shunt 62. Thus, the lengths of the conductive traces 40 and 46 are considerably shortened, and do not necessarily contribute to the overall width of the sensor, as shown in FIG. 4A. Analogously to the first and second embodiments, the one of the traces (trace 46 in FIG. 4A) may be made wider than the others to accommodate on-chip trimming to balance the bridge. Moreover, it will be seen that the contact points between sensor elements are much closer to the sensor elements themselves. This minimizes the susceptibility to EMI, and as diagramatically shown in the bridge circuit of FIG. 4C, minimizes the parasitic resistance in the bridge circuit. Since all bonding pads are likewise outside of the bridge circuit, the effects of contact resistance shifting due to wire bonding are eliminated.

As seen in FIG. 4B, the conductive traces 54 and 58 are separated from the underlying conductive shunts 60 and 62, respectively, by electric isolation layers 64 and 66. In a mechanization of the illustrated embodiment, the electric isolation layers 64 and 66 were formed of thin film tantalum oxide, the shunts 60–62 were formed of platinum (Pt), and the conductive traces 40–52 were formed of platinum, overlaid with gold (Au). As described above, the substrate 48 comprises a silicon substrate coated with a thermally insulative layer of polyimide, silicon dioxide, silicon nitride or oxy-nitride.

Figure 5A:
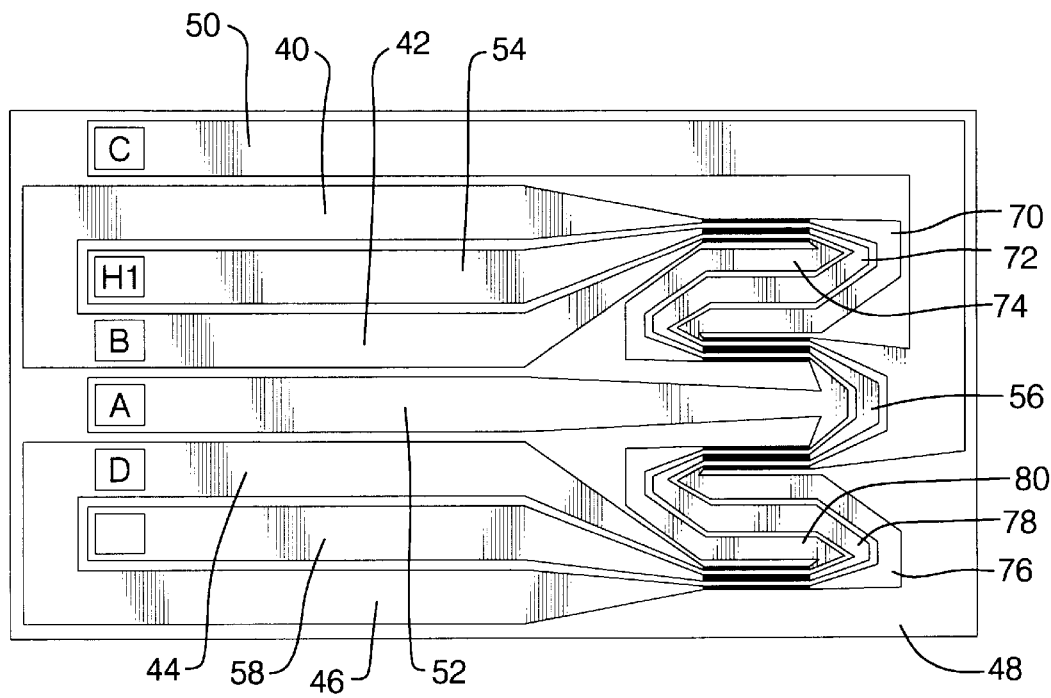
FIGS. 5A–5B depict mass airflow sensing devices according to a fourth embodiment of this invention.
Figure 5B:
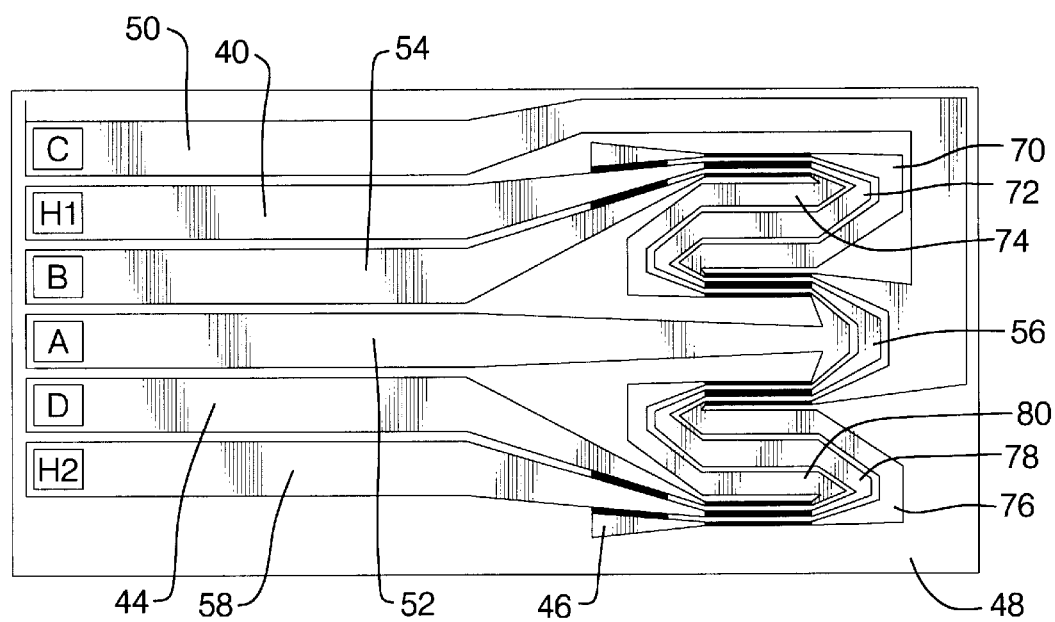

FIGS. 5A–5B depict a fourth embodiment of this invention in which the sensor comprises four sets of heater/detectors. In this case, there are eight sensor elements, so that each leg of the bridge circuit comprises two serially connected sensor elements. The overall width of these sensors is substantially unchanged, subject to minimum heater-to-heater spacing requirements, and the additional conductive traces 70–80 couple the serially connected sensor elements. The topology of the sensor of FIG. 5A is otherwise analogous to that of FIG. 3 in that the bridge connections are made on on-chip in one layer; and the topology of the sensor of FIG. 5B is otherwise analogous to that of FIG. 4A in that the bridge connections are made on on-chip using lateral conductive shunting.

Figure 6A:
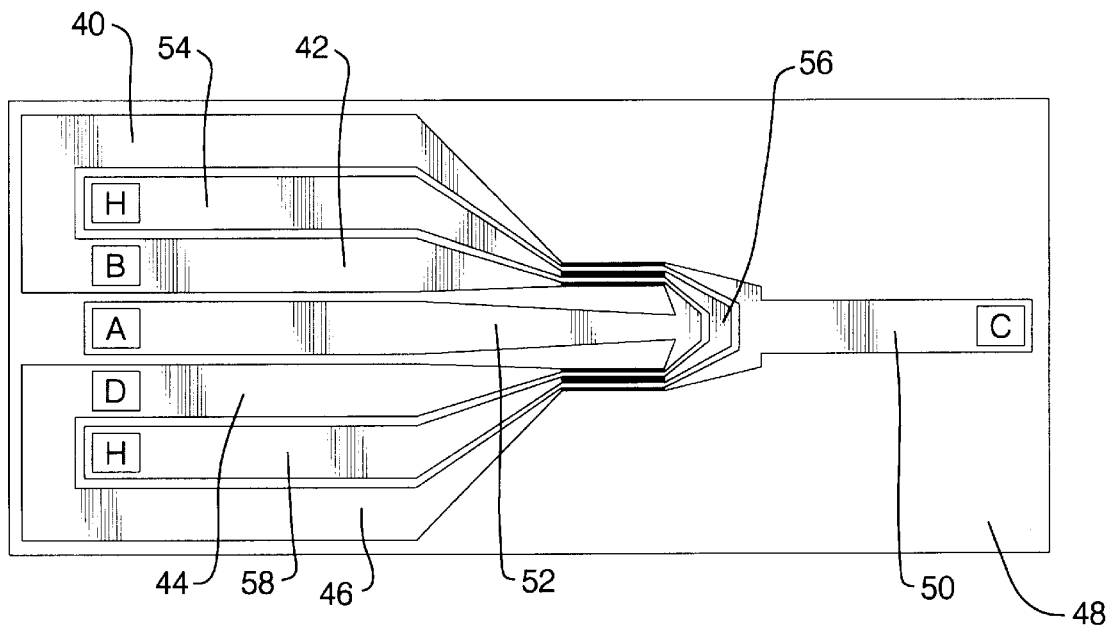
FIGS. 6A–6B depict mass airflow sensing devices according to a fifth embodiment of this invention.
Figure 6B:
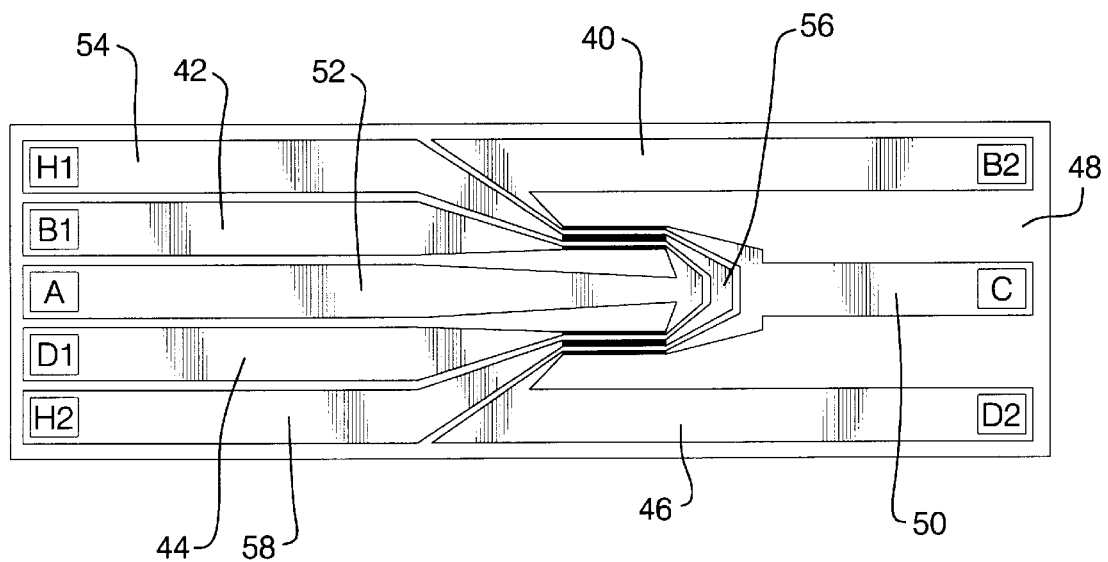

Finally, FIGS. 6A–6B depict a fifth embodiment of this invention in which further reductions in the overall sensor width are achieved by providing bond pads at both ends of the substrate 48. The topology of the sensor of FIG. 6A is generally analogous to that of FIG. 3 except that the conductive trace 50 extends rightwardly, terminating in a bond pad C at the right-most end of the substrate 48. The topology of the sensor of FIG. 6B is generally analogous to that of FIG. 2 except that the conductive traces 40, 46 and 50 extends rightwardly, terminating in the bond pads B2, D2 and C at the right-most end of the substrate 48.

Obviously, it should be recognized that the illustrated embodiments are not exhaustive in nature, and that other variations and modifications will occur to those skilled in the art. In this regard, it will be understood that sensor devices incorporating such variations and modifications may fall within the scope of this invention, which is defined by the appended claims. Further, it should be understood that the mass airflow sensing device of this invention is not limited to use with an internal combustion engine, and can be used in any application in which it is desired to measure the mass airflow through a manifold or duct.

What is claimed is:

1. A bidirectional mass airflow sensing device for measuring airflow through a duct, comprising:

first and second thermally isolated heating elements disposed on a thermally insulative substrate in line with an airflow in the duct;

first and second temperature dependent sensor elements oppositely disposed about said first heating element on said substrate in line with said airflow so that heat developed by passage of current through said first heating element heats both said first sensor element and said second sensor element;

third and fourth temperature dependent sensor elements oppositely disposed about said second heating element on said substrate in line with said airflow so that heat developed by passage of current through said second heating element heats both said third sensor element and said fourth sensor element; and output means for developing an output signal indicative of airflow in said duct based on differences in temperature between said first and second and said third and fourth sensor elements, including a Wheatstone bridge circuit having first, second, third and fourth legs, the first sensor element being connected in said first leg, the second sensor element being connected in said second leg, the third sensor element being connected in said third leg, and the fourth sensor element being connected in said fourth leg.

2. The bidirectional mass airflow sensing device of claim 1, wherein said sensor elements have substantially equal resistances with no airflow, and a plurality of conductive traces are formed on said substrate for coupling said sensor elements to respective bridge connection sites, at least one of said conductive traces being trimmable to null said output signal when there is no airflow, thereby to calibrate said bridge.

3. The bi-directional mass airflow sensing device of claim 2, wherein said at least one conductive trace has a width that is greater than the widths of the other of said plurality of conductive traces.

4. The bi-directional mass airflow sensing device of claim 1, including a conductive trace electrically coupling one end of said first heating element to one end of said second heating element.

5. The bi-directional mass airflow sensing device of claim 1, wherein said output means includes a first on-chip coupling means formed on said substrate for electrically coupling one end of said first sensor element to one end of said second sensor element, and a second on-chip coupling means formed on said substrate for electrically coupling one end of said third sensor element to one end of said fourth sensor element.

6. The bi-directional mass airflow sensing device of claim 5, wherein said first and second on-chip coupling means each comprise a conductive trace formed on said substrate.

7. The bidirectional mass airflow sensing device of claim 5, including first and second conductive traces formed on said substrate for coupling said first and second heating elements to respective bond pads in a margin of said substrate, said first on-chip coupling means including a first conductive shunt trace disposed lateral to and underlying said first conductive trace, and said second on-chip coupling means including a second conductive shunt trace disposed lateral to and underlying said second conductive trace.

8. The bi-directional mass airflow sensing device of claim 7, wherein said first conductive shunt trace is disposed in proximity to said first and second sensor elements, and second conductive shunt trace is disposed in proximity to said third and fourth sensor elements, thereby to minimize parasitic resistance in said Wheatstone bridge circuit.

9. The bi-directional mass airflow sensing device of claim 7, including a first electrical insulation layer between said first conductive shunt trace and said first conductive trace, and a second electrical insulation layer between said second conductive shunt trace and said second conductive trace.

10. The bi-directional mass airflow sensing device of claim 1, further comprising:

third and fourth thermally isolated heating elements disposed on said substrate in line with said airflow;

fifth and sixth temperature dependent sensor elements oppositely disposed about said third heating element on said substrate in line with said airflow so that heat developed by passage of current through said third heating element heats both said fifth sensor element and said sixth sensor element;

seventh and eighth temperature dependent sensor elements oppositely disposed about said fourth heating element on said substrate in line with said airflow so that heat developed by passage of current through said fourth heating element heats both said seventh sensor element and said eighth sensor element; and said output means including means connecting said fifth, sixth, seventh and eighth sensor elements in series, respectively, with said first, second, third and fourth sensor elements in the legs of said Wheatstone bridge circuit.

11. The bi-directional mass airflow sensing device of claim 10, including conductive traces serially coupling said first, second, third and fourth heating elements.

* * * * *